United States Patent [19]
Abel et al.

[11] 4,109,149
[45] Aug. 22, 1978

[54] SHADE REDUCING APERTURE STOP FOR THERMAL IMAGING SYSTEMS

[75] Inventors: Irving R. Abel, Lexington; Bruce R. Reynolds, Hudson, both of Mass.

[73] Assignee: Honeywell Inc., Minneapolis, Minn.

[21] Appl. No.: 802,996

[22] Filed: Jun. 3, 1977

[51] Int. Cl.² .......................... G01J 1/00; G02B 21/06
[52] U.S. Cl. ................................... 250/347; 250/353; 350/17
[58] Field of Search ............... 250/338, 340, 353, 505, 250/511, 347; 350/17, 205, 206

[56] References Cited
U.S. PATENT DOCUMENTS 3,867,633  2/1975  Patrick et al. .......................... 250/338
3,905,675  9/1975  McCracken .......................... 350/17

*Primary Examiner*—Alfred E. Smith
*Assistant Examiner*—Janice A. Howell
*Attorney, Agent, or Firm*—David R. Fairbairn; Theodore F. Neils

[57] ABSTRACT

An aperture stop is provided near the detector imaging lens of a thermal imaging system to prevent the infrared detector from viewing portions of the thermal imaging system itself, particularly the walls of the optical housing and the housing of the scanner within the optical housing. This eliminates "shading" problems which can occur in thermal imaging systems having a moving scanner within the optical housing.

9 Claims, 3 Drawing Figures

SHADE REDUCING APERTURE STOP FOR THERMAL IMAGING SYSTEMS

ORIGIN OF THE INVENTION

The present invention was made in the course of a contract with the Department of the Air Force.

BACKGROUND OF THE INVENTION

The present invention relates to thermal imaging systems. In particular, the present invention reduces "shading" problems which have been encountered in some types of thermal imaging systems.

Thermal imaging systems have been the subject of ever-increasing interest in recent years. These systems which provide images based upon invisible infrared radiation received from a scene, have found use in reconnaissance systems, in navigational systems for aiding navigation of vehicles under conditions of limited visibility, in diagnostic medical systems which aid physicians in detecting various forms of cancer, and in a variety of other applications.

One common type of thermal imaging system includes an objective lens, a moving scanner, an "imaging" or "detector" lens, and an infrared detector (or detector array), all of which are mounted in an optical housing. Radiation from the scene is received by the objective lens. The moving scanner scans the scene and the imaging lens images the thermal radiation from the scanner onto the detector. By moving the scanner, the detector effectively is scanned across a field of view, so that the electrical signals from the detector can be used to generate an image of the scene.

In thermal imaging systems of this type, it is general practice to provide an aperture stop near the objective lens. The purpose of this aperture stop is to provide for a constant amount of radiation from all points in the field of view.

SUMMARY OF THE INVENTION

One undesirable result of the use of an aperture stop at the objective is that the beam of radiation received by the imaging lens and focused onto the infrared detector has a larger diameter than the optical components "in front of" the imaging lens. The detector, therefore, can "see" thermal radiation from the walls of the optical housing and the scanner housing. In systems in which the walls of the optical housing and the scanner housing are at the same temperature, the thermal imaging system performs adequately even though the detector does see thermal radiation from the thermal imaging system itself rather than merely from the scene.

However, as higher speed scanning mechanisms have been developed for use in thermal imaging systems, the heat generated within the scanner housing has created a serious "shading" problem which adversely affects the performance of the thermal imaging system. The shading problem is the result of the detector being permitted to see thermal radiation emitted by the walls of the optical housing and the scanner housing. Variations in the temperature of the walls of the optical housing and the scanner housing, together with variations in the amount of the walls which the detector sees during a scan, result in a spurious fluctuating background signal which is unrelated to the radiation received from the scene. This, of course, degrades the performance of the thermal imaging system and causes errors in the image which is provided. In addition, if the thermal imaging system is equipped to make radiometric measurements and provide an indication of absolute temperature (as is often needed in medical thermal imaging systems), the varying thermal radiation from the optical housing and scanner housing causes radiometric errors.

The present invention overcomes the shading problem which has been encountered in thermal imaging systems having a high speed moving scanner within the optical housing. In the present invention, an aperture stop is positioned proximate the imaging lens to prevent any thermal radiation or a variation of thermal radiation from the walls of the optical housing and the scanner housing from being received by the detector. The size of the shade reducing aperture stop may be selected so that only thermal radiation from the scene is received by the infrared detector.

DETAILED DESCRIPTION OF THE PREFERRED EMBODIMENTS

Figure 1:
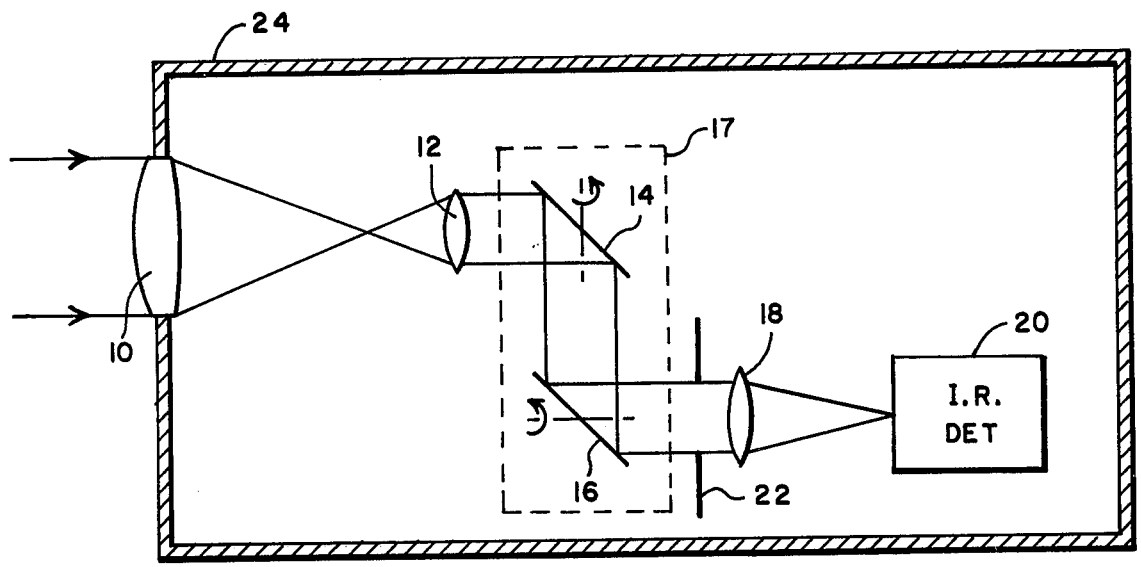
FIG. 1 shows a thermal imaging system utilizing the shade reducing aperture stop of the present invention.

The thermal imaging system shown in FIG. 1 overcomes the shading problem which is present in the prior art thermal imaging systems having a moving scanner within an optical housing. The system shown in FIG. 1 includes an objective lens 10, a recollimator lens 12, scanning mirrors 14 and 16, scanner housing 17, detector lens 18, infrared detector 20, shade reducing aperture stop 22, and optical housing 24.

Objective lens 10 and recollimator lens 12 from a telescope type optical system for magnifying the scene which is viewed by the thermal imaging system. Radiation from the scene is received by objective lens 10, is focused by objective lens 10, and is recollimated by recollimator lens 12.

Scanning mirrors 14 and 16 provide a scan of the scene in two dimensions, typically the horizontal and vertical directions. Scanning mirrors 14 and 16 are driven by a motor assembly (not shown), and are contained, together with the motor assembly, in scanner housing 17 (outlined by dashed lines in FIG. 1).

The radiation from the moving scanner formed by mirrors 14 and 16 is focused by imaging or detector lens 18 at an image or focal plane. Infrared detector 20 is positioned at the image plane and produces output signals in response to the received thermal radiation. Infrared detector 20 may be a single detector or an array of detectors. When the detector is a semiconductive infrared detector, infrared detector 20 typically includes a Dewar assembly which cools the detector to cryogenic temperatures and maintains the detector within a vacuum environment.

The output signals of infrared detector 20 are supplied to signal processing circuity (not shown) which may be within optical housing 24 or may be external to optical housing 24. The processed output signals may be used to control a real time display such as a television cathode ray tube, or may be stored for later use in generating a visual image of the thermal image viewed by the system.

In the prior art systems, shade reducing aperture stop 22 is not present. As a result, infrared detector 20 "sees" portions of scanner housing 17 and portions of the inner walls of optical housing 24 which are in front of scanning mirrors 14 and 16. Infrared detector 20 generates erroneous output signals because the temperatures of the walls of housing 24 and scanner housing 17 are not uniform, and because the amount of the walls being viewed by infrared detector 20 varies during a scan. In other words, spurious temperature fluctuations are detected by infrared detector 20 which are not the result of the scene being viewed. The problem is termed "shading" and is particularly pronounced in high speed thermal imaging systems in which a significant amount of heat is being generated within the scanner housing 17.

Aperture stop 22 is placed near detector lens 18 to eliminate or substantially reduce the shading problem. Thermal radiation emitted by the walls of optical housing 24 and scanner housing 17 is blocked by aperture 22. The optical components in front of aperture 22 (i.e. objective lens 10, recollimator lens 12, and mirrors 14 and 16) are sufficiently oversized with respect to the size of aperture stop 22 to insure that only thermal radiation from the scene falls onto infrared detector 20. This requirement is usually met without any increase in size of the optical components by properly selecting the size of aperture stop 22.

Aperture stop 22 eliminates or substantially reduces the shading problem in thermal imaging systems of the type having a moving scanner within the optical housing, without requiring prohibitively large scanning mirrors. Although it would be possible to reduce the shading problem by increasing the size of scanning mirrors 14 and 16 (and, therefore, scanner housing 17), this is generally not a practical solution. The cost of high quality infrared components is very high, and typically increases substantially with increasing size of the components. In addition to the cost considerations, increasing the size of the scanning mirrors makes it more difficult to drive the mirrors at the high speeds required, and usually dictates an undesirable increase in the overall size of the thermal imaging system. The use of the shade reducing aperture stop 22 avoids use of extremely large scanner optics while still overcoming the shading problem.

Figure 2A:
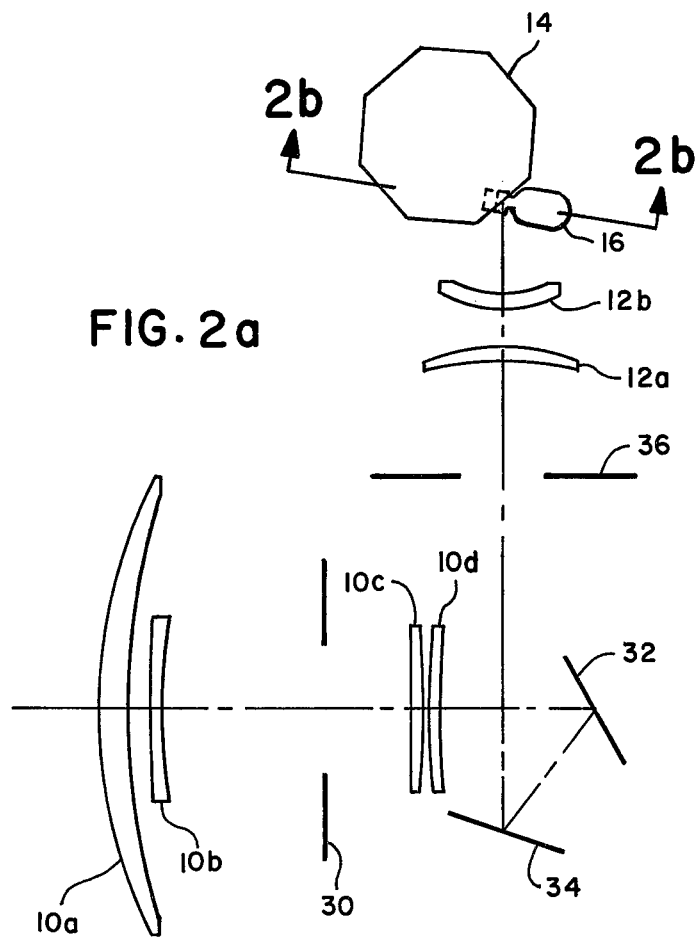
FIGS. 2a and 2b show another thermal imaging system utilizing the shade reducing aperture stop of the present invention.
Figure 2B:
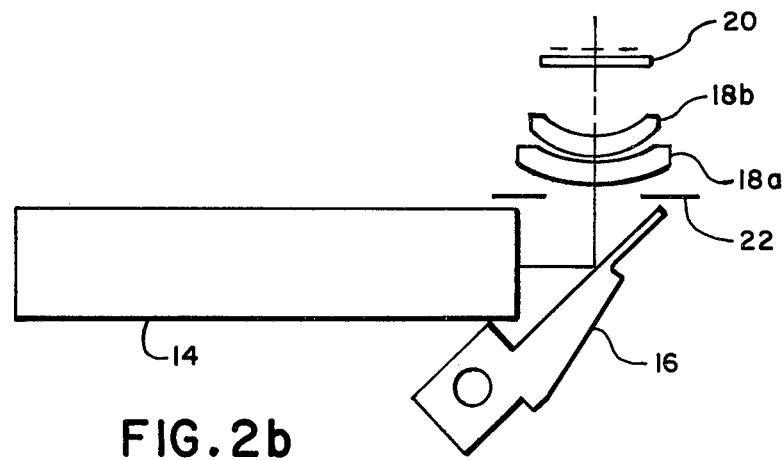

FIGS. 2a and 2b show the optical configuration of a forward-looking infrared (FLIR) thermal imaging system which utilizes the shade reducing aperture stop of the present invention. For convenience, the optical housing, the scanner housing, and the scanner motor are not shown in FIGS. 2a and 2b.

FIG. 2a is a top view of the optical system. As shown in FIG. 2a, the objective optics include lenses 10a, 10b, 10c, and 10d, aperture stop 30, mirrors 32 and 34, and field stop 36. Infrared radiation from the scene passes through lenses 10a and 10b, aperture stop 30, and lenses 10c and 10d to mirror 32. The radiation is reflected by mirror 32 to mirror 34 and then through field stop 36. Aperture stop 30 and field stop 36 are both formed by opaque members which have openings through which the radiation may pass.

The objective lens assembly shown in FIG. 2a is for wide angle field-of-view operation. For narrow field-of-view operation (not shown), aperture stop 30 and lenses 10c and 10d are removed, lens 10b is moved back to a position which is approximately the location of lens 10c, and an additional lens is mounted between lens 10b and mirror 32. No other modification of the system is required to convert from wide angle to narrow angle operation. The viewing of the optical housing around the objective lens is more pronounced generally in the narrow angle mode if the shade reducing aperture stop, 22, is not provided.

The recollimator lens assembly shown in FIG. 2a includes lenses 12a and 12b, which are positioned between field stop 36 and the scanner mechanism formed by rotating mirror 14 and nodding mirror 16. Rotating mirror 14 provides a high speed horizontal scan, while nodding mirror 16 provides a vertical indexing of the horizontal scan to provide a high speed raster scan of the field-of-view.

FIG. 2b shows mirrors 14 and 16 along view 2b—2b of FIG. 2a. In addition, FIG. 2b shows the detector imaging lens assembly formed by lenses 18a and 18b, the detector array which forms the infrared detecting portion of detector 20, and shade reducing aperture stop 22. As in FIG. 1, shade reducing aperture stop 22 is positioned near the imaging lens assembly to prevent the detectors of the detector array from viewing portions of the scanner housing and the optical housing. Aperture stop 22, when used in the system of FIGS. 2a and 2b, provides a significant reduction in the shading problem without requiring an increase in scanner mirror size.

In conclusion, the present invention overcomes a problem which degrades the performance of thermal imaging systems which use a moving scanner within the optical housing. The present invention substantially reduces or eliminates the shading problem by means of an aperture stop proximate the imaging lens which prevents thermal radiation emitted by the optical housing and the scanner from reaching the infrared detector.

Although the present invention has been described with reference to preferred embodiments, workers skilled in the art will recognize that changes may be made in form and detail without departing from the spirit and scope of the invention. For example, the optical systems shown in FIG. 1 and in FIGS. 2a and 2b represent only two examples of thermal imaging systems utilizing the shade reducing aperture stop of the present invention. The specific configuration of the telescope section, the scanner section, the imaging lens section, and the detector section of the thermal imaging system may, of course, vary. In addition, the specific shape and size of the aperture stop may vary depending upon the particular scanning parameters, diffraction determined resolution, and energy gathering factors of the system. In any case, the aperture stop of the present invention is positioned proximate the imaging lens assembly to reduce the shading effect by preventing the detector assembly from receiving thermal radiation emitted by the scanner housing and the optical housing.

The embodiments of the invention in which an exclusive property or right is claimed are defined as follows:

1. A thermal imaging system comprising:
 telescope means for receiving thermal radiation from a scene;
 scanning means for receiving thermal radiation from the telescope means and scanning the scene;
 imaging lens means for imaging thermal radiation received from the scanning means at an image plane;
 infrared detector means positioned proximate the image plane for producing output signals in response to the thermal radiation;
 housing means for housing the telescope means, the scanning means, the imaging lens means, and the infrared detector means; and aperture stop means positioned proximate the imaging lens means for preventing thermal radiation from the housing means from being received by the infrared detector means.

2. The thermal imaging system of claim 1 wherein the telescope means, the imaging lens means, the infrared detector means, and the aperture stop means have fixed positions within the housing means and the scanning means moves within the housing means.

3. The thermal imaging system of claim 2 wherein the housing means comprises:
scanner housing means for housing the scanning means; and
optical housing means for housing the telescope means, the scanner housing means, the scanning means, the imaging lens means, and the infrared detector means.

4. The thermal imaging system of claim 3 wherein the scanning means comprises:
first and second scanning mirrors for scanning the scene in first and second directions.

5. The thermal imaging system of claim 4 wherein the aperture stop means prevents thermal radiation emitted by the scanner housing means from being received by the infrared detector means.

6. The thermal imaging system of claim 2 wherein the telescope means comprises:
objective lens means for receiving thermal radiation from the scene and focusing the thermal radiation;
recollimator lens means positioned between the objective lens means and the scanning means for recollimating the thermal radiation.

7. In a thermal imaging system having an optical housing containing a moving scanner for scanning a scene, imaging lens means for focusing thermal radiation from the scene scanned by the moving scanner, and infrared detector means positioned to receive thermal radiation from the imaging lens means, the improvement comprising:
shade reducing aperture stop means positioned proximate the imaging lens means for limiting the thermal radiation received by the infrared detector means from sources other than the scene.

8. The invention of claim 7 and further comprising scanner housing means for housing the moving scanner, and wherein the shade reducing aperture stop means prevents thermal radiation emitted by the scanner housing means from being received by the infrared detector means.

9. The invention of claim 7 wherein the optical housing also contains objective means for receiving thermal radiation from the scene.

* * * * *